United States Patent [19]
Katoh et al.

[11] Patent Number: 4,863,617
[45] Date of Patent: Sep. 5, 1989

[54] PROCESS AND APPARATUS FOR SEPARATING SOLID-LIQUID COMPOSITIONS

[75] Inventors: Yoshihisa Katoh, Toyota; Takashi Ogawa, Kariya; Yukihiko Nagao, Kariya; Mitsumasa Hasegawa, Kariya, all of Japan

[73] Assignee: Toshiba Ceramics Co., Ltd., Tokyo, Japan

[21] Appl. No.: 276,391

[22] Filed: Nov. 25, 1988

[30] Foreign Application Priority Data

Dec. 4, 1987 [JP] Japan .................... 62-305688

[51] Int. Cl.$^4$ .......................... B01D 17/038
[52] U.S. Cl. ........................ 210/788; 210/804; 210/805; 210/806
[58] Field of Search .......... 210/767, 787, 788, 791, 210/800, 801, 804, 805, 806; 422/142; 60/39.182

[56] References Cited

U.S. PATENT DOCUMENTS

| | | | |
|---|---|---|---|
| 4,255,926 | 3/1981 | Heyn et al. | 60/39.182 |
| 4,425,757 | 1/1984 | Heyn et al. | 60/39.182 |
| 4,464,247 | 8/1984 | Thacker | 422/142 |

FOREIGN PATENT DOCUMENTS

| | | |
|---|---|---|
| 59-48646 | 11/1984 | Japan . |
| 61-271096 | 12/1986 | Japan . |
| 62-19175 | 1/1987 | Japan . |
| 62-138184 | 6/1987 | Japan . |
| 62-224286 | 10/1987 | Japan . |

Primary Examiner—Frank Sever
Attorney, Agent, or Firm—Foley & Lardner, Schwartz, Jeffery, Schwaab, Mack, Blumenthal & Evans

[57] ABSTRACT

A process for separating of solid-liquid compositions, comprises providing a liquid to be filtered in a liquid container, circulating the liquid through the liquid container, through a ceramic filter and through a liquid cyclone, filtering fine particles contained in the liquid by the ceramic filter and separating aggregates or coarse particles contained in the liquid by the liquid cyclone. An apparatus for carrying out the process is also disclosed.

9 Claims, 2 Drawing Sheets

PROCESS AND APPARATUS FOR SEPARATING SOLID-LIQUID COMPOSITIONS

BACKGROUND OF THE INVENTION

This invention relates to a process for separating solid-liquid compositions, as well as to an apparatus for carrying out the process.

A circulating system having a cross-flow type tubular ceramic filter is known. In this system, a liquid, which includes some solids, is contained in a container and is sent into and passes through the tubular ceramic filter. After that, the liquid is sent back into the container. During filtration, the pressure of the liquid is kept at a constant value.

Even if the liquid contains very large solid particles, the residual liquid is successively recirculated. Doubtlessly, such large particles cannot pass through the cross-flow type ceramic filters. But it is difficult to remove such large particles from the liquid before or during filtering.

The liquid is successively recirculated and filtered many times while it contains the large particles. Thus, the liquid is gradually concentrated. When the liquid becomes concentrated, the load applied to the filtering apparatus increases while filtering efficiency decreases. In addition, filters often become clogged.

SUMMARY OF THE INVENTION

It is therefore an object of the present invention to provide an improved process for separating solid-liquid compositions in which coarse particles contained in a starting liquid can be removed from the liquid so that a ceramic filter is not clogged and the liquid is not greatly concentrated at a high filtering efficiency.

Another object of the invention resides in the provision of an apparatus for carrying out the improved process.

According to the present invention, a process for separating of solid and liquid phases comprises providing a liquid to be filtered in a liquid container, circulating the liquid through the liquid container, through a ceramic filter and through a liquid cyclone in such a way that the liquid contained in the liquid container can be repeatedly sent back into the liquid container, filtering fine particles contained in the liquid by the ceramic filter and separating aggregates or coarse particles contained in the liquid by the liquid cyclone.

An apparatus for separating a solid-liquid composition comprises means for providing a solid-liquid composition as a source, wherein the composition contains fine particles and course particles or aggregates to be separated from the liquid, means for circulating the solid-liquid composition from the source through a ceramic filter to separate a filtrate portion of the liquid passing through the filter from fine particles collected by the filter and from a residual portion of the composition and through means for separating coarse particles or aggregates from the residual portion centrifugally, and means for returning the residual portion to the source.

The cyclone is installed at any one of the intermediate positions between the liquid container, and the ceramic filter, i.e., the liquid cyclone can be between the ceramic filter and the providing means or can be between the providing means and means for supplying power for circulating or can be between the circulating means and the ceramic filter.

Preferably, the liquid cyclone consists of plural liquid cyclones having a different separating ability with respect to one another.

Preferably, the liquid is water, an oil, or a chemical or food composition.

Further objects, features and advantages of the present invention will become apparent from the detailed description of preferred embodiments that follows, when considered together with the accompanying figures of drawings.

DETAILED DESCRIPTION OF THE PREFERRED EMBODIMENTS

The present invention, comprising a combination of a ceramic filter and a liquid cyclone, makes it possible to provide a process for filtering that has excellent characteristics not only regarding thermal resistance, wear resistance, abrasion resistance, corrosion resistance, and fine filtration, but also regarding filtering efficiency.

Figure 1:
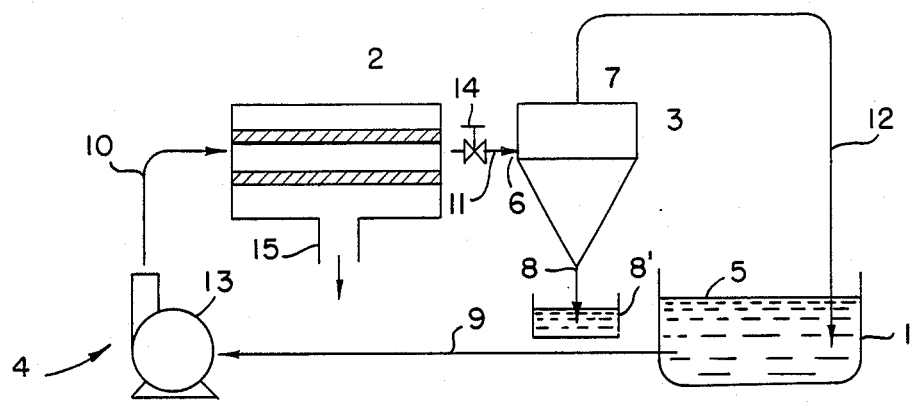
FIG. 1 is a schematic explanation view showing a process and an apparatus for separating solid-liquid compositions according to an embodiment of this invention.
Figure 3:
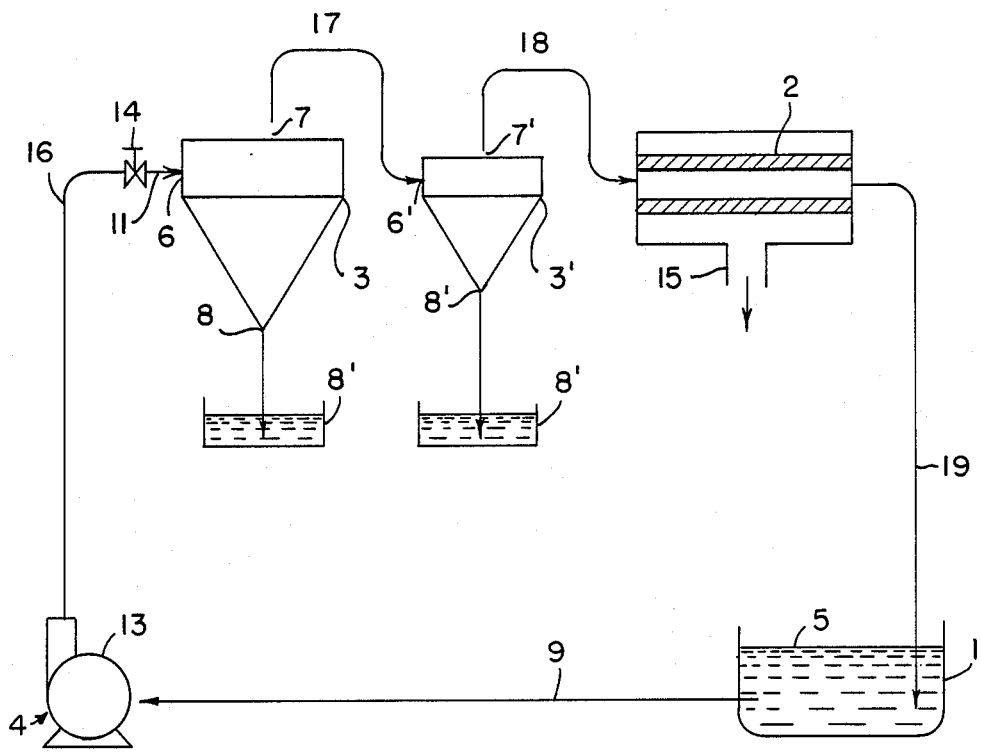
FIG. 3 is a schematic explanation view showing a process and an apparatus, for separating solid-liquid compositions, having plural liquid cyclones according to an embodiment of this invention.

FIGS. 1 and 3 show examples of embodiments of apparatuses for realizing the present invention. As shown in FIG. 1, a liquid container 1 stores a liquid 5 to be filtered. A ceramic filter 2 is used to filter fine solid particles contained in the liquid 5. A liquid cyclone 3 is used to separate aggregates or coarse solid particles.

A circulating means 4 repeatedly sends the liquid 5 stored in the liquid container 1 through the ceramic filter 2 and the cyclone 3 into the container 1.

The liquid 5 stored in the liquid container 1 contains solid particles including aggregate or coarse particles. Fine particles contained in the liquid 5 are filtered by the ceramic filter 2. Aggregate or coarse particles are separated by the liquid cyclone 3 so as to be removed from the liquid 5.

The ceramic filter 2 is in the shape of a pipe or tube, and a casing of the filter, preferably made of stainless steel, has a discharge port 15. An example of the ceramic filter 2 is described in Japanese Patent Publication No. 48646/84. The ceramic filter 2 is made of high-purity alumina and is of a multi-layer structure type. The structure is not symmetric, such that the pore diameters gradually change from an inside layer to an outside layer. The average pore diameter of the outer layer is larger than that of the inner layer. A preferred embodiment of the ceramic filter 2 shown in FIG. 1 has an outer diameter of 19 mm and an inner diameter of 15 mm. The average pore diameter of the inside layer is 0.1 microns.

The liquid cyclone 3 comprises a cylindrical part and a conical part therein. The cylindrical part has an inlet port 6 in its tangential direction. The cylindrical part has an outlet 7 at the center of its upper portion. The conical part has an exhaust port 8 at its lower end so as to discharge coarse particle slurry. A tank 8', is placed under and joined to the exhaust port 8.

The circulating means 4 has a pump 13 and a valve 14, and is connected by plural circulation pipes 9, 10, 11, 12.

The circulation pipe 9 is installed between the liquid container 1 and the pump 13. The circulation pipe 10 is installed between the pump 13 and the ceramic filter 2. The circulation pipe 11 is installed between the ceramic filter 2 and the liquid cyclone 3. The circulation pipe 12 is installed between the liquid cyclone 3 and the liquid container 1. The valve 14 is installed at an intermediate portion of the circulation pipe 11. The amount of liquid flowing into the liquid cyclone 3 can be regulated by means of valve 14.

In FIG. 3, he same numerals which are used in FIG. 1 are used to indicate the same elements. The circulating means 4 has a pump 13 and a valve 14, and is connected by plural pipes 9, 16, 17, 18, 12. Two liquid cyclones 3, 3' having inlet ports 6, 6', outlets 7, 7,, exhaust port 8, 8, are used to separate aggregate or coarse solid particles. The circulation pipe 16 is installed between the pump 13 and the liquid cyclone 3. The circulation pipe 17 is installed between the cyclone 3 and the cylinder 3' The circulation pipe 18 is installed between the cyclone 3' and the ceramic filter 2. The circulation pipe 19 is installed between the ceramic filter 2 and the liquid container 1.

EXAMPLE

Now, operation of the invention will be explained according to a preferred example of the present invention. The apparatus of FIG. 1 described above was used for the example. The liquid 5 was water containing activated carbon. Thirty liters of water and 80 g (300 cc) of carbon were mixed. Grain size of the activated carbon was from 0.02 mm to 10 microns, or less.

The average pore diameter of the inside layer of the ceramic filter 2 was 0.1 microns.

The diameter of the liquid cyclone 3 was 100 mm and its height was 400 mm. The cyclone 3 was made of stainless steel.

During operation, the pressure of the liquid at the outlet 7 of the liquid cyclone 3 was lower than the pressure of the liquid at the entrance 6. The pressure of the liquid at the entrance 6 of the liquid cyclone 3 was 2 $Kg/cm^2$, while the pressure of the liquid at the outlet 7 of the liquid cyclone 3 was 0.5 $Kg/cm^2$. A flow rate of the liquid at the entrance 6 of the liquid cyclone 3 was 8 m/sec.

When the pump 13 started, the liquid 5 stored in the liquid container 1 was sent to the ceramic filter 2 through the circulating pipe 9, the pump 13 and the circulating pipe 10. When the liquid 5 passed through the ceramic filter 2, the liquid 5 was filtered in a cross-flow manner. The filtrate was discharged through the outlet 15.

Next, the residual liquid 5 was sent via the circulating pipe 11 to the cylindrical part of the cyclone 3 through the entrance 6 at a high flow rate in a tangential direction. The liquid 5 produced an eddy current in the liquid cyclone 3 so that a centrifugal force was produced. The solid particles having a large size and a large specific gravity were moved toward the wall of the liquid cyclone 3 by means of the centrifugal force and gradually settled to a lower conical part of the liquid cyclone 3 so as to form a slurry. This slurry containing coarse particles was discharged through the outlet 8 into the tank 8, during the filtering operation. Fine particles, together with liquid, remained at a central portion of the cyclone and flowed through the outlet 7 at the upper center portion of the cyclone, thereby to be sent back into the liquid container 1.

As the operation above mentioned was repeated, the solid particles in the liquid were separated from the liquid.

When the volume of the liquid decreased to 10 liters, an additional 30 liters of water and 80 g of activated carbon were added into the liquid container 1, whereby the liquid was continuously filtered.

Because the particles having a large size and a large specific gravity were discharged as slurry through the outlet 8 of the liquid cyclone 3, even if the liquid was successively filtered so as to decrease in volume, the liquid was never greatly concentrated.

Figure 2:
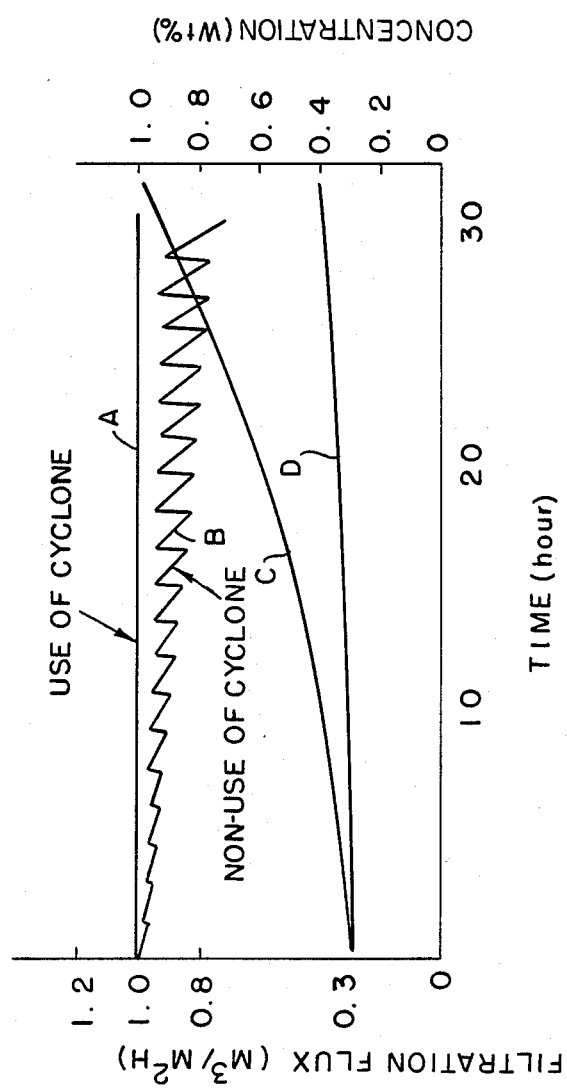
FIG. 2 is a graph showing conditions in which activated carbon is filtered.

FIG. 2 shows conditions under which the activated carbon was filtered. A characteristic curve A shows the filtering flux in the case where the liquid cyclone 3 was used. A characteristic curve B shows the filtering flux in the case where no liquid cyclone was used. As can be seen from FIG. 2, the filtering flux is constant in the case where the liquid cyclone was used because the slurry of coarse particles could be discharged during the filter operation so as to preclude clogging. On the other hand, in the case where no liquid cyclone was used, the filtering flux decreased in the form of a sawtooth, even if backwashing was repeatedly carried out.

In FIG. 2, a characteristic curve C shows the concentration of solids in the liquid in the case where no liquid cyclone was used. According to the curve C, the concentration gradually increased. A characteristic curve D shows the concentration of the solid in the liquid in the case where the liquid cyclone was used. In this case, the concentration was almost constant because aggregates or coarse particles could be continuously or intermittently discharged and removed from the liquid during the filter operation.

The size, the structure, the material quality and number of the liquid cyclones and the ceramic filter can be optionally selected according to the liquid's characteristics.

The ceramic filter can have any cross-section, such as a hexagonal shape or a pipe shape. The former shape of ceramic filter, for example, can have 19 holes each having a diameter of 4 mm. Needless to say, it is expected that the present invention shows higher filtering efficiency if backwashing is applied to it.

Having described a specific embodiment of our process and apparatus, it is believed obvious that modifications and variations of our invention by persons skilled in the art are possible in light of the above teachings.

What is claimed is:

1. A process for separating a solid-liquid composition, which comprises the steps of:
   providing a liquid to be filtered in a liquid container, the liquid containing fine particles and coarse particles or aggregates;
   circulating the liquid through the liquid container, through a ceramic filter and through a liquid cyclone in such a way that a residual portion of the liquid not filtered through the filter is repeatedly sent back into the liquid container;
   filtering fine particles contained in the liquid by the ceramic filter; and
   separating aggregates or coarse particles contained in the liquid by the liquid cyclone.

2. A process according to claim 1, wherein the cyclone is located between the ceramic filter and the liquid container.

3. A process according to claim 1, wherein the cyclone is located downstream of the liquid container and upstream of the ceramic filter.

4. A process according to claim 3, wherein the cyclone is located downstream of a means for circulating the liquid.

5. A process according to claim 1, wherein the liquid cyclone consists of plural cyclones having a different separating ability with respect to one another.

6. A process according to claim 1, wherein the liquid comprises water or an oil.

7. A process according to claim 6, wherein the solid-liquid composition comprises a chemical composition or a food composition.

8. A process for separating a solid-liquid composition, comprising the steps of:

(a) providing a solid-liquid at a source, wherein the composition contains fine particles and coarse particles or aggregates to be separated from the liquid;

(b) circulating the solid-liquid composition from the source
  (i) through a filtration stage comprising a ceramic filter, to separate a filtrate portion of the liquid passing through the filter from fine particles collected by the filter and from a residual portion of the composition, and
  (ii) through a dynamic separation stage, to centrifugally separate coarse particles or aggregates from the residual portion;

(c) returning the residual portion to the source, and (d) recirculating the residual portion from the source by separating step (b) at least once.

9. A process according to claim 8, further comprising the step of periodically adding additional solid-liquid composition at the source.

* * * * *